United States Patent
Roundy et al.

(10) Patent No.: US 9,652,597 B2
(45) Date of Patent: May 16, 2017

(54) SYSTEMS AND METHODS FOR DETECTING INFORMATION LEAKAGE BY AN ORGANIZATIONAL INSIDER

(71) Applicant: Symantec Corporation, Mountain View, CA (US)

(72) Inventors: Kevin Alejandro Roundy, El Segundo, CA (US); Anand Kashyap, Pune (IN)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 14/262,471

(22) Filed: Apr. 25, 2014

(65) Prior Publication Data
US 2015/0261940 A1     Sep. 17, 2015

(30) Foreign Application Priority Data
Mar. 12, 2014   (IN) .............................. 291/KOL/2014

(51) Int. Cl.
| | | |
|---|---|---|
| *G06F 21/10* | (2013.01) | |
| *H04L 29/08* | (2006.01) | |
| *G06Q 50/00* | (2012.01) | |
| *G06Q 10/10* | (2012.01) | |
| *H04L 29/06* | (2006.01) | |

(52) U.S. Cl.
CPC ............. *G06F 21/10* (2013.01); *G06Q 10/10* (2013.01); *G06Q 50/01* (2013.01); *H04L 67/02* (2013.01); *H04L 67/1097* (2013.01); *H04L 67/22* (2013.01); *H04L 67/42* (2013.01)

(58) Field of Classification Search
CPC ........... G06F 21/50; G06F 21/556; H04L 9/00

USPC ............................... 726/22–26; 713/168–169
See application file for complete search history.

(56) References Cited

U.S. PATENT DOCUMENTS

| | | | | |
|---|---|---|---|---|
| 7,730,011 B1 * | 6/2010 | Deninger | ............ | H04L 63/1408 707/602 |
| 8,112,301 B2 * | 2/2012 | Harvey | .............. | G06Q 10/0639 705/14.41 |

(Continued)

OTHER PUBLICATIONS

"Presidential Memorandum—National Insider Threat Policy and Minimum Standards for Executive Branch Insider Threat Programs", www.whitehouse.gov/the-press-office/2012/11/21/presidential-memorandum-national-insider-threat-policy-and-minimum-stand, as accessed Feb. 6, 2014, The White House, Office of the Press Secretary, (Nov. 21, 2012).

(Continued)

*Primary Examiner* — Hadi Armouche
*Assistant Examiner* — Viral Lakhia
(74) *Attorney, Agent, or Firm* — FisherBroyles LLP

(57) ABSTRACT

A computer-implemented method for detecting information leakage by an organizational insider may include (1) identifying a set of organizational insiders of an organization, (2) identifying a set of public forums used by one or more organizational insiders, (3) identifying a set of messages posted to one or more public forums, (4) creating a message record corresponding to each message, with the record including a message summary, and a set of message metadata fields, (5) consolidating message records with common metadata fields into a message summary record, and (6) identifying, based on the message summary record, an information leakage threat. Various other methods, systems, and computer-readable media are also disclosed.

20 Claims, 5 Drawing Sheets

(56) References Cited

U.S. PATENT DOCUMENTS

| | | | | |
|---|---|---|---|---|
| 8,407,194 B1* | 3/2013 | Chaput | G06F 21/552 | |
| | | | 707/694 | |
| 8,544,060 B1* | 9/2013 | Khetawat | H04L 63/20 | |
| | | | 713/165 | |
| 8,615,807 B1* | 12/2013 | Higbee et al. | 726/25 | |
| 8,881,040 B2* | 11/2014 | Li | G06F 17/30672 | |
| | | | 715/703 | |
| 8,887,300 B1* | 11/2014 | Gates et al. | 726/27 | |
| 8,972,511 B2* | 3/2015 | Freire | G06Q 50/01 | |
| | | | 705/901 | |
| 8,978,092 B2* | 3/2015 | Balinsky | G06F 2221/210 | |
| | | | 726/1 | |
| 9,390,240 B1* | 7/2016 | Brisebois | G06F 21/31 | |
| 9,501,666 B2* | 11/2016 | Lockett | H04L 63/20 | |
| 9,501,744 B1* | 11/2016 | Brisebois | G06N 5/048 | |
| 2007/0169199 A1* | 7/2007 | Quinnell | G06F 21/577 | |
| | | | 726/25 | |
| 2009/0198707 A1* | 8/2009 | Rohner | H04L 63/1408 | |
| 2011/0022812 A1* | 1/2011 | van der Linden | G06F 9/5077 | |
| | | | 711/163 | |
| 2011/0099602 A1* | 4/2011 | Apparao | G06Q 10/06 | |
| | | | 726/1 | |
| 2012/0023586 A1* | 1/2012 | Flickner | G06F 17/30424 | |
| | | | 726/25 | |
| 2012/0137367 A1* | 5/2012 | Dupont | G06F 21/00 | |
| | | | 726/25 | |
| 2012/0311703 A1* | 12/2012 | Yanovsky et al. | 726/22 | |
| 2013/0232543 A1* | 9/2013 | Cheng | G06F 21/6218 | |
| | | | 726/1 | |
| 2013/0340082 A1* | 12/2013 | Shanley | G06F 21/577 | |
| | | | 726/25 | |
| 2013/0340089 A1* | 12/2013 | Steinberg et al. | 726/27 | |
| 2014/0026182 A1* | 1/2014 | Pearl et al. | 726/1 | |
| 2014/0165137 A1* | 6/2014 | Balinsky | G06F 21/554 | |
| | | | 726/1 | |
| 2014/0230066 A1* | 8/2014 | Hurwitz et al. | 726/26 | |
| 2014/0258226 A1* | 9/2014 | Noteboom | G06F 17/30377 | |
| | | | 707/615 | |
| 2014/0380425 A1* | 12/2014 | Lockett | H04L 63/20 | |
| | | | 726/4 | |
| 2015/0006258 A1* | 1/2015 | Salama | G06Q 30/0206 | |
| | | | 705/7.35 | |
| 2015/0100527 A1* | 4/2015 | Ryan | 706/20 | |
| 2015/0106946 A1* | 4/2015 | Soman | G06F 21/602 | |
| | | | 726/26 | |

OTHER PUBLICATIONS

Senator, Ted E., et al., "Detecting Insider Threats in a Real Corporate Database of Computer Usage Activity", http://www.cc.gatech.edu/~bader/papers/PRODIGAL-KDD2013.pdf, as accessed Feb. 6, 2014, KDD'13, ACM, Chicago, Illinois, (Aug. 11-14, 2013).
Comstock, Courtney, "The Dark Side of Expert Networks: 20 Ways Corporate Spies Get Information", http://www.businessinsider.com/how-expert-networks-get-information-to-give-clients, as accessed Feb. 6, 2014, Business Insider, Inc., (Nov. 29, 2010).
Kevin Alejandro Roundy, et al.; Systems and Methods for Determining Whether Confidential Project Data Has Been Leaked; U.S. Appl. No. 14/969,620, filed Dec. 15, 2015.
"Corporate Breach Protection", http://www.tiversa.com/solutions/enterprise/Corporate-Breach-Protection/, as accessed Oct. 30, 2015, Tiversa, (Nov. 11, 2011).
Kyzer, Lindy, "Job Seekers Leak NSA Program Names on LinkedIn", https://news.clearancejobs.com/2013/06/19/job-seekers-leak-nsa-program-names-on-linkedin/, as accessed Oct. 30, 2015, ClearanceJobs, (Jun. 19, 2013).
"Tiversa", http://www.tiversa.com/, as accessed Oct. 30, 2015, (May 17, 2003).
Johann Roturier, et al; Systems and Methods for Determining the Risk of Information Leaks from Cloud-Based Services; U.S. Appl. No. 15/182,101, filed Jun. 14, 2016.
Johann Roturier, et al; Systems and Methods for Preventing Data Loss Through Internet-Based Systems; U.S. Appl. No. 15/181,467, filed Jun. 14, 2016.
Maltego, https://www.paterva.com/web7/, as accessed Apr. 22, 2016, Paterva, (On or before Apr. 22, 2016).
BitSight, https://www.bitsighttech.com/, as accessed Apr. 22, 2016, BitSight Technologies, (Jun. 25, 2011).
SecurityScorecard, https://securityscorecard.com/, as accessed Apr. 22, 2016, (Feb. 28, 2004).
Skybox, https://www.skyboxsecurity.com/solutions/attack-surface-visibility, as accessed Apr. 22, 2016, Skybox Security, Inc., (On or before Apr. 22, 2016).
QuadMetrics, https://www.quadmetrics.com/solutions/cyber_insurance_data, as accessed Apr. 22, 2016, (On or before Apr. 22, 2016).
Customers, http://www.workday.com/customers.php, as accessed Apr. 22, 2016, Workday, Inc. (On or before Apr. 22, 2016).
Andra Zaharia, 10+ Critical Corporate Cyber Security Risks—A Data Driven List [Updated], https://heimdalsecurity.com/blog/10-critical-corporate-cyber-security-risks-a-data-driven-list/, as accessed Apr. 22, 2016, Heimdal Security, (Mar. 21, 2015).
Yang Liu et al., Predicting Cyber Security Incidents Using Feature-Based Characterization of Network-Level Malicious Activities, http://www-personal.umich.edu/~youngliu/pub/iwspa01-liu.pdf, IWSPA '15 Proceedings of the 2015 ACM International Workshop on International Workshop on Security and Privacy Analytics, (Mar. 4, 2015).
Yang Liu et al., Cloudy with a Chance of Breach: Forecasting Cyber Security Incidents, https://www.usenix.org/system/files/conference/usenixsecurity15/sec15-paper-liu.pdf, Proceedings of the 24th USENIX Security Symposium, USENIX Association, (Aug. 12-14, 2015).
ZeroFOX, https://www.zerofox.com/, as accessed Apr. 22, 2016, (May 15, 2007).
RiskIQ, https://www.riskiq.com/, as accessed Apr. 22, 2016, (Nov. 30, 2001).
Matchlight, https://terbiumlabs.com/matchlight.html, as accessed Apr. 22, 2016, Terbium Labs, (on or before Apr. 22, 2016).
Digital Shadows, https://www.digitalshadows.com/, as accessed Apr. 22, 2016, (Jan. 19, 2002).
Kevin Borders et al., Quantifying Information Leaks in Outbound Web Traffic, http://www-personal.umich.edu/~kborders/leaks.pdf, 2009 30th IEEE Symposium on Security and Privacy, (May 17-20, 2009).
Nilangi Mane et al., Detection of guilty agents by maintaining the confidentiality of the data on the web, http://ieeexplore.ieee.org/document/7002395/, 2014 International Conference on Advances in Electronics, Computers and Communications (ICAECC), (Oct. 10-14, 2014).

* cited by examiner

SYSTEMS AND METHODS FOR DETECTING INFORMATION LEAKAGE BY AN ORGANIZATIONAL INSIDER

BACKGROUND

All organizations, even the most transparent, have confidential or sensitive information. At the very least, the personal information of members of the organization should be protected from public disclosure. In addition, most organizations have confidential information related, for example, to products, clients, strategic plans, owners, suppliers, or donors that has intrinsic value and should therefore be protected from disclosure to competitors or other outsiders. Other information, such as organizational infrastructure designs, security measures, or insider personal information may have less intrinsic value but can be leveraged by a malicious outsider to gain access to organizational secrets or other assets.

Espionage, in various forms, long predates the Internet and social networks, but public electronic forums pose a significant challenge to organizations trying to protect confidential information. Outsiders who wanted to obtain confidential information about an organization once had to rely on tactics like physically entering buildings, eavesdropping on conversations, or searching trash cans for confidential documents. Now anyone in the world may gather information about an organization by searching web sites, social networks, or other public electronic forums. Disgruntled or malicious insiders may use public forums to leak confidential information or post complaints about problems or vulnerabilities within the organization. Even the most loyal and enthusiastic organizational insiders may ignorantly disclose confidential information, for example, by discussing a project they are involved in on an electronic discussion board.

Accordingly, the instant disclosure identifies and addresses a need for additional and improved systems and methods for detecting information leakage by an organizational insider.

SUMMARY

As will be described in greater detail below, the instant disclosure describes various systems and methods for detecting information leakage by an organizational insider by searching public forums used by organizational insiders for messages containing sensitive or confidential data related to the organization and compiling message records containing message summaries and metadata. The systems and methods described herein may then consolidate the message records into message summary records and identify information leakage threats based on the message summary records.

In one example, a computer-implemented method for detecting information leakage by an organizational insider may include (1) identifying a set of organizational insiders of an organization, (2) identifying a set of public forums used by one or more organizational insiders, (3) identifying a set of messages posted to one or more public forums, (4) creating a message record corresponding to each message, with the record including a message summary and a set of message metadata fields, (5) consolidating message records with common metadata fields into a message summary record, and (6) identifying, based on the message summary record, an information leakage threat.

In one embodiment, the set of public forums may include (1) a social media site, (2) a website, (3) a blog, (4) an electronic mailing list, (5) a discussion board, (6) an electronic bulletin board, and/or (7) a wiki. In some examples, identifying the set of messages posted on the public forum may include: (1) identifying a set of keywords pertaining to (a) organizational infrastructure, (b) confidential organizational information, and/or (c) organizational insider personal information, and/or (2) searching the public forum for messages containing at least one of the keywords. In some examples, identifying the set of keywords may include: (1) intercepting network communications transmitted by (a) a network gateway, (b) a network router, (c) an email gateway, (d) a network firewall, (e) a proxy server, and/or (f) a data-loss-prevention program, and/or (2) compiling the set of keywords from the intercepted network communications.

In some examples, searching the public forum for messages containing the keyword may include searching the public forum using (1) a search engine, (2) a web crawler, and/or (3) a database query. In one embodiment, the set of message metadata fields may include (1) a message source, (2) a message destination, (3) a timestamp, (4) a message type, (5) a user identification, (6) a risk score, (7) a data loss prevention classification, and/or (8) a sentiment. In some examples, consolidating message records into a message summary record may include creating a message summary record from multiple message records with at least one common message metadata field.

In one embodiment, the message summary record may include (1) at least one message metadata field common to the message records consolidated into the message summary record, and (2) an information leakage threat rating. In some examples, the computer-implemented method may further include taking a security action based on the information leakage threat.

In one embodiment, a system for implementing the above-described method may include (1) an insider identification module, stored in memory, that identifies a set of organizational insiders, (2) a forum identification module that identifies a set of public forums used by one or more organizational insiders, (3) a message identification module that identifies a set of messages posted to one or more public forums, (4) a message record module, stored in memory, that creates a message record corresponding to each of the messages identified, with the message record including a message summary and a set of message metadata fields, (5) a consolidation module, stored in memory, that consolidates message records with common metadata fields into a message summary record, (8) a threat identification module that identifies, based on the message summary record, an information leakage threat, and (9) at least one processor configured to execute the insider identification module, the forum identification module, the message identification module, the message record module, the consolidation module, and the threat identification module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) identify a set of organizational insiders, (2) identify a set of public forums used by one or more organizational insiders, (3) identify a set of messages posted to one or more public forums, (4) create a message record corresponding to each of the message identified, with the message record including a message summary and a set of message metadata fields, (5) consolidate message records with common metadata fields into a message summary record, and (6) identify, based on the message summary record, an information leakage threat.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
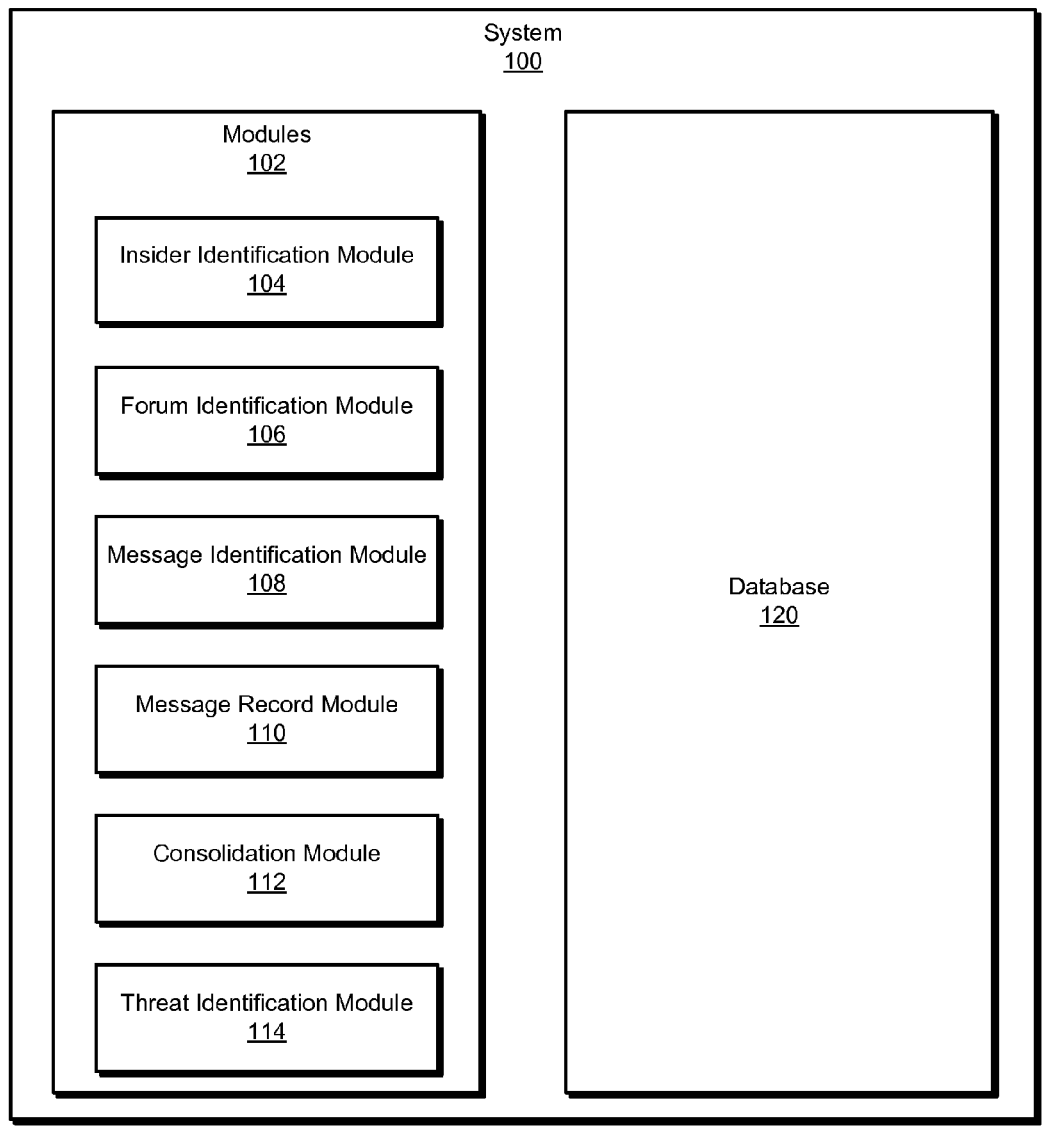
FIG. 1 is a block diagram of an exemplary system for detecting information leakage by an organizational insider.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for detecting information leakage by an organizational insider. As will be explained in greater detail below, the systems and methods described herein may detect information leakage by an organizational insider by identifying keywords related to confidential organizational information, searching public forums for messages including the keywords, and collecting, summarizing, and analyzing data and metadata related to messages found on public forums that include the keywords. Using these systems and methods may result in a variety of advantages. For example, information leakage may be identified even when the organizational insider leaking the information cannot be identified by the content of the message or where the message was found. Leaked information may be identified regardless of whether it was leaked by a disgruntled or malicious insider, or by an otherwise loyal organizational insider who innocently leaks confidential information, ignorant of the potential consequences to the organization. Information leakage may also be identified when messages containing confidential information do not originate within the organization's computing network—for example, when an organizational insider posts entries to a blog, wiki, or social network from home.

Figure 2:
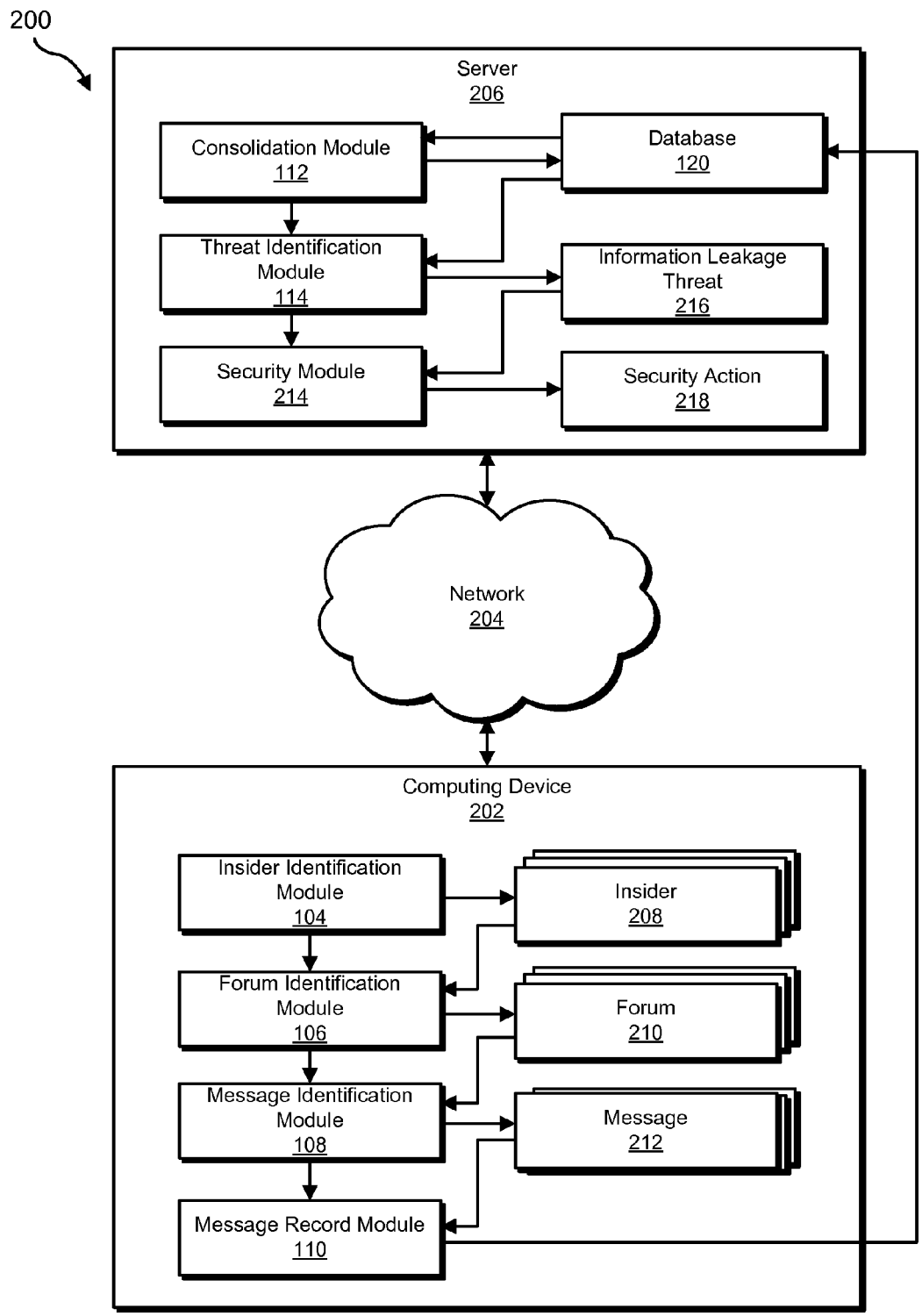
FIG. 2 is a block diagram of an additional exemplary system for detecting information leakage by an organizational insider.

The following will provide, with reference to FIGS. 1-2, detailed descriptions of exemplary systems for detecting information leakage by an organizational insider. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 4 and 5, respectively.

FIG. 1 is a block diagram of an exemplary system 100 for detecting information leakage by an organizational insider. As illustrated in this figure, exemplary system 100 may include one or more modules 102 for performing one or more tasks. For example, and as will be explained in greater detail below, exemplary system 100 may also include an insider identification module 104 that may identify a set of organizational insiders, a forum identification module 106 that may identify a set of public forums used by at least one organizational insider, and a message identification module 108 that identifies a set of messages posted to one or more public forums. Exemplary system 100 may additionally include a message record module 110 that may create a message record corresponding to each message in the set of messages, with the message record including a message summary and a set of message metadata fields.

Exemplary system 100 may also include a consolidation module 112 that may consolidate a plurality of message records into a message summary record according to the sets of metadata fields in the plurality of message records. Threat Identification module 114 may identify, based on the message summary record, an information leakage threat. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 410 in FIG. 4, and/or portions of exemplary network architecture 500 in FIG. 5. One or more of modules 102 in FIG. 1 may also represent all or portions of one or more special-purpose computers configured to perform one or more tasks.

As illustrated in FIG. 1, exemplary system 100 may also include one or more databases, such as database 120. In some examples, database 120 may be configured to store records containing message data and/or metadata from public forums, consolidated message data, and/or organizational insider data.

Database 120 may represent portions of a single database or computing device or a plurality of databases or computing devices. For example, database 120 may represent a portion of server 206 in FIG. 2, computing system 410 in FIG. 4, and/or portions of exemplary network architecture 500 in FIG. 5. Alternatively, database 120 in FIG. 1 may represent one or more physically separate devices capable of being accessed by a computing device, such as server 206 in FIG. 2, computing system 410 in FIG. 4, and/or portions of exemplary network architecture 500 in FIG. 5.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. In one example, computing device 202 may be programmed with one or more of modules 102 and/or may store all or a portion of the data in database 120. Additionally or alternatively, server 206 may be programmed with one or more of modules 102 and/or may store all or a portion of the data in database 120.

In one embodiment, one or more of modules 102 from FIG. 1 may, when executed by at least one processor of computing device 202 and/or server 206, enable computing device 202 and/or server 206 to detect information leakage by an organizational insider. For example, and as will be described in greater detail below, insider identification module 104 may be programmed to identify a set of organizational insiders 208 of an organization. Forum identification module 106 may be programmed to identify a set of public forums 210 used by at least one organizational insider 208 in set of organizational insiders 208. Message identification module 108 may be programmed to identify a set of messages 212 posted to at least one public forum 210 in the set of public forums. Message record module 110 may be programmed to create a message record corresponding to each message 212 in the set of messages, with the message record comprising a message summary and a set of message metadata fields. Consolidation module 112 may be programmed to consolidate a plurality of message records into a message summary record according to the sets of metadata fields in the plurality of message records. Threat identification module 114 may be programmed to identify, based on the message summary record, an information leakage threat 216. Security module 116 may be programmed to take a security action 218 based on information leakage threat 216.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 410 in FIG. 4, or any other suitable computing device.

Server 206 generally represents any type or form of computing device that is capable of storing, comparing, and/or providing data. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 500 in FIG. 5, or the like. Network 204 may facilitate communication or data transfer using wireless or wired connections. In one embodiment, network 204 may facilitate communication between computing device 202 and server 206.

Figure 3:
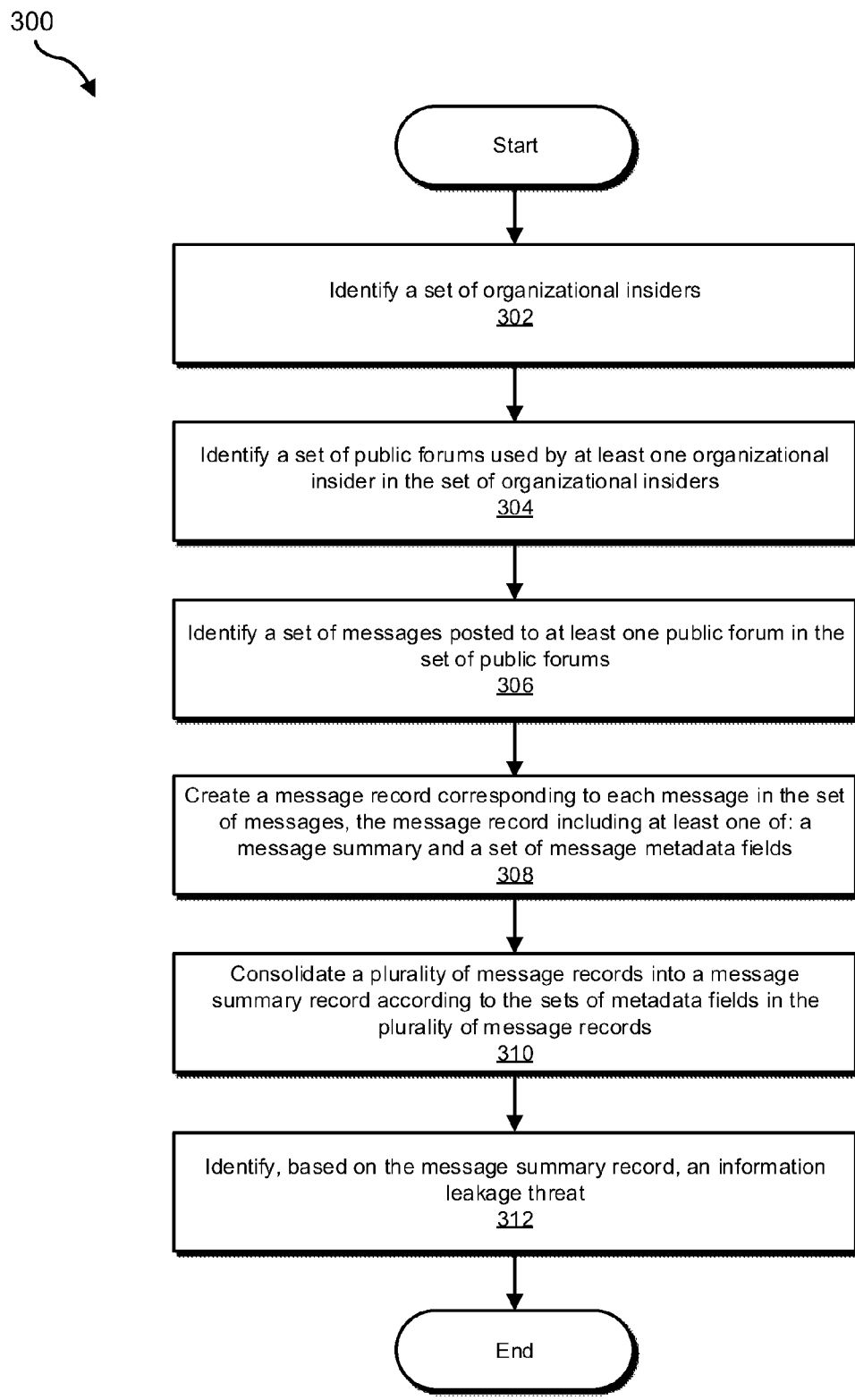
FIG. 3 is a flow diagram of an exemplary method for detecting information leakage by an organizational insider.

FIG. 3 is a flow diagram of an exemplary computer-implemented method 300 for detecting information leakage by an organizational insider. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 410 in FIG. 4, and/or portions of exemplary network architecture 500 in FIG. 5.

As illustrated in FIG. 3, at step 302 one or more of the systems described herein may identify a set of organizational insiders of an organization. For example, at step 302 insider identification module 104 may, as part of computing device 202 in FIG. 2, identify a set of organizational insiders 208 of an organization.

The phrase "organizational insider," as used herein, generally refers to any member of an organization who has access to confidential or sensitive information, or information that may be exploited to gain access to confidential or sensitive information. Organizational insiders may include, for example, employees of a company, contract workers, or volunteer workers for a non-profit organization. Since personal information about organizational insiders may be leveraged in a social engineering scheme to obtain confidential information, for all practical purposes, every member of an organization may potentially be considered to be an organizational insider.

Insider identification module 104 may identify a set of organizational insiders in any suitable manner. For example, insider identification module 104 may access a list, directory, or database containing organization membership data. In some examples, it may be advantageous to limit the set of organizational insiders to those with access to computing resources or networks. In such cases, insider identification module 104 may identify a set of organizational insiders by collecting network usernames and associated user information, or by a querying a network directory services database. In an especially large organization, insider identification module 104 may limit the set of organizational insiders only to those who access external networks from inside the organizational network. Insider identification module 104 may do so by intercepting network communications at connection points between internal and external networks, such as network gateways, firewalls, or proxy servers, and identifying organizational insiders communicating with external networks.

At step 304 of FIG. 3, one or more of the systems described herein may identify a set of public forums used by at least one organizational insider in the set of organizational insiders. For example, at step 304 forum identification module 106 may, as part of computing device 202 in FIG. 2, identify a set of public forums 210 used by at least one organizational insider in the set of organizational insiders 208.

The phrase "public forum," as used herein, generally refers to a network site that hosts messages that may be searched or viewed by the public. Some public forums may require a minimal degree of security, such as requiring users to create an account or request access from an administrator before viewing or posting messages. Some public forums allow anyone to read or post messages; others allow read access to anyone, but restrict message posting to registered users. Public forums may include (1) social media sites, (2) certain websites that allow users to post messages, (3) blogs, (4) electronic mailing lists, (5) discussion boards, (6) electronic bulletin boards, and/or (7) wikis.

Forum identification module 106 may identify public forums used by organizational insiders in a variety of ways. For example, forum identification module 106 may use set of organizational insiders 208 identified by insider identification module 104 to search popular social media sites for organizational insiders using the site. In another example, forum identification module 106 may analyze network communications between internal and external networks, such as network gateways, firewalls, or proxy servers, and identify public forums accessed by organizational insiders by network address or uniform resource identifier (URI).

At step 306 one or more of the systems described herein may identify a set of messages posted to one or more public forums. For example, at step 306 message identification module 108 may, as part of computing device 202 in FIG. 2, identify a set of messages 212 posted to one or more public forums 210 identified by forum identification module 106.

The term "message," as used herein, generally refers to a block of text submitted for display on a public forum. Each message may be identified by the date and time submitted and the user ID or name of the person submitting the message. Messages may also be identified in any other suitable manner. Messages may include status updates or comments on a social media site, posts on an electronic bulletin board, email messages submitted to an electronic mailing list, blog entries or comments, wiki entries, or edits to existing wiki entries. Read access to messages may be restricted to a group of users or open to anyone.

Message identification module 108 may identify a set of messages posted to public forums in a variety of ways. For example, message identification module 108 may search for messages posted to public forums by organizational insiders by searching the forums for the names of the organizational insiders and identifying messages posted by each of the organizational insiders. In other examples, identifying the set of messages posted on a public forum may include (1) identifying a set of keywords pertaining to organizational infrastructure, confidential organizational information, and/ or organizational insider personal information and/or (2) searching the public forum for messages containing at least one of the keywords.

The term "keyword," as used herein, generally refers to a word or phrase that captures the essence of an item of confidential or sensitive information and that can be used to efficiently search for and identify messages related to the confidential or sensitive information. For example, the name of an unannounced product may be used to identify messages leaking information related to the product.

The phrase "organizational infrastructure," as used herein, generally refers to physical structures, equipment, services, or facilities that an organization may use or need to function. Examples include office directories or floor plans, network diagrams, server names or network addresses, and/or inventories of computing hardware, operating system versions, or installed software. Organizational infrastructure information may be used to identify vulnerabilities that may be exploited to gain access to organizational assets or disrupt operations.

The phrase "confidential organizational information," as used herein, generally refers to information proprietary to an organization that could result in harm (such as financial loss or disruption of operations) to the organization, if disclosed. Confidential organizational information essentially includes any sensitive information that does not fit under the categories of organizational infrastructure information or organizational insider personal information.

The phrase "organizational insider personal information," as used herein, generally refers to personal identity information for members of the organization, such as names, job titles, organization charts, phone numbers, home addresses, or emergency contact information. Personal identity information may be used to impersonate members of the organization to obtain access to organizational assets or as the basis of more elaborate forms of identity theft. Examples abound of system administrators who should have known better, but who nevertheless were convinced to provide access to confidential data by someone who claimed to be a member of the organization and who knew the names of a supervisor, the names of coworkers, or other personal information related to the person they were impersonating.

Identifying a set of keywords may be performed in any suitable manner. In some examples, identifying a set of keywords may include: (1) intercepting network communications transmitted by communication resources such as a network gateway or router, email gateway, network firewall, proxy server, or data-loss-prevention program and (2) compiling the set of keywords from the intercepted network communications. In some examples, searching the public forum for messages containing the keyword may include searching the public forum using (1) a search engine, (2) a web crawler, or (3) database queries.

As used herein, the phrase "data loss prevention program" generally refers to any software module and/or collection of computer-executable instructions capable of implementing at least one part of a data loss prevention system. Examples of the types of actions that data loss prevention components may perform include, without limitation, monitoring, intercepting, blocking, and/or suspending attempts to read and/or write data, collecting and storing information relevant to evaluating whether data loss prevention policies have been violated, sending data and statistics to other data loss prevention components, and/or any other suitable data loss prevention function. Data loss prevention programs, and the overarching data loss prevention systems that these data loss prevention programs are a part of, may be configured in a variety of ways across a variety of computing devices and networks. For example, these components and systems may be installed on a single computing device (such as an endpoint), multiple computing devices on a shared local network, centrally-managed servers, gateways, or other computing devices within an enterprise network, or any other suitable configuration or number of computing devices.

As used herein, the phrase "search engine" may refer to any system that accepts search requests and returns search results. Search engines may be implemented as standalone websites that search the contents of other websites, integrated into a website to facilitate searching the website's content, as software programs that can search the contents of files or network locations, or integrated into an operating system to search the contents of files in local or network-accessible directories. Search engines typically provide options to modify searches, such as to restrict a search to one website, or to return only results that have two search terms within a specified number of words of each other.

As used herein, the term "web crawler" generally refers to a software program that browses web pages for the purpose of indexing and/or searching. A web crawler may build an index for use by a search engine or identify and copy web content for more detailed analysis, such as more detailed textual analysis, or recognition of text displayed in images.

Searching public forums for messages containing keywords may be performed in a variety of ways. In many instances, combinations of search methods may be used to identify potentially-leaked data and eliminate false positive search results. For example, a web crawler may identify and copy web pages with one or more keywords for submission to a search engine for more detailed analysis. Multiple searches may also be performed using a single search process. For example, an initial search just for the name of an organizational executive may identify many messages containing public information or related to other people with the same name. A subsequent search combining the executive's name with other personal information (such as the executive's mobile phone number) may identify messages where the executive's personal information has been leaked. Because the number of related keywords may quickly multiply to a large number of combinations, multiple searches may be required to identify a set of candidate messages and to select the subset of messages most likely to contain leaked information. In some examples, a publicly-accessible database may be searched using database queries.

Returning to FIG. 3, at step 308 one or more of the systems described herein may create a message record corresponding to each message in the set of messages, with the message record including a message summary and a set of message metadata fields. For example, at step 308 message record module 110 may, as part of computing device 202 in FIG. 2, create a message record corresponding to each message in set of messages 212, with the message record including a message summary and a set of message metadata fields. Message record module 110 may store message records in database 120.

The term "metadata," as used herein, generally refers to information about a collected message. A set of message metadata fields may include, without limitation, (1) a message source (such as the IP address of the user posting the message), (2) a message destination (e.g., an IRL or network address identifying where the message was posted), (3) a timestamp, (4) a message type (email, blog post, or wiki entry, for example), (5) a user identification, (6) a risk score, (7) a data loss prevention classification, and/or (8) a sentiment.

In some examples, a risk score may be a rating of the sensitivity or security level associated with the message contents. For example, keywords may be assigned a security rating, depending on the level of risk associated with disclosure. The security ratings of the combination of keywords identified in a message may be used to calculate a risk score for the message. A data loss prevention classification may be assigned by a data loss prevention program, based upon such factors as the type of information (financial, product-related, personal), who is authorized to access the information, where the information was created and stored, and what channels are authorized for communicating the information. A sentiment may be an assessment of the tone of the message, based upon words in the message other than keywords. For example, a message may include words portraying an angry or solicitous tone.

Message record module 110 may create and store message records using any suitable combination of data or textual analysis tools, data loss prevention systems, and/or database management systems. For example, message record module 110 may store the entire message or use a text analysis program to select words summarizing the content of the message. Metadata identifying the message source, destination, timestamp, message type, and user identification may be collected by a search engine or web crawler. A risk score and data loss prevention classification may be assigned by a data loss prevention system, and a sentiment may be assigned by a textual analysis program. Once the message record is compiled, it may be stored in a database by any suitable database management system.

At step 310 one or more of the systems described herein may consolidate multiple message records into a message summary record according to the sets of metadata fields in the message records. For example, at step 310 consolidation module 112 may, as part of server 206 in FIG. 2, consolidate a number of message records stored in database 120 into a message summary record according to the sets of metadata fields in the message records. Consolidation module 112 may also store the message summary records in database 120.

Consolidation module 112 may consolidate multiple message records into a message summary record in a variety of ways. For example, consolidation module 112 may identify a set of message records with at least one common message metadata field, such as a set of messages originating from one organizational insider, or with the same data loss prevention classification, indicating that the information in the messages all contain confidential financial information. Consolidation module 112 may then create a message summary record that includes the common metadata field and database index numbers for the records containing the common metadata field. In one embodiment, the message summary record may include (1) one or more message metadata fields common to the message records consolidated into the message summary record and (2) an information leakage threat rating. The information leakage threat rating may be calculated based on the risk score and data loss prevention classification or any other suitable combination of factors.

At step 312, one or more of the systems described herein may identify, based on the message summary record, an information leakage threat. For example, at step 312 threat identification module 114 may, as part of server 206 in FIG. 2, identify, based on a message summary record stored in database 120, an information leakage threat 216. Threat identification module 114 may identify an information leakage threat in a number of ways. For example, threat identification module 114 may simply identify message summary records with an information leakage threat rating above a threshold.

In some examples, threat identification module 114 may include a machine-learning-based or rule-based classification that identifies information leakage threats based on a number of factors in addition to the information leakage threat rating. For example, a machine-learning-based approach may include identifying a set of training data that includes messages from public forums related to organizations previously experiencing information leakage (where the set of training data indicates which messages included leaked information). The training data may then be used to build a machine learning classifier that classifies message summary records, based on message metadata, according to a likelihood that the summarized messages contain leaked information. The risk of information leakage for the messages summarized to create the message summary records with the machine learning classifier may then be assessed by providing the message metadata as input to the machine learning classifier.

In some examples, systems described herein may include taking a security action based on the information leakage threat. For example, security module 214 may, as part of server 206 in FIG. 2, initiate or perform security action 218, based on the information leakage threat 216 identified by threat identification module 114. As used herein, the term "security action" generally refers to any type or form of process that attempts to protect against data leaks. Examples of security actions include, without limitation, scanning files, blocking or suspending file transfer attempts, logging security information, sending alerts, monitoring file activity, and/or any other suitable security action.

As explained above, the systems and methods described herein may detect information leakage by an organizational insider by identifying public forums used by organizational insiders, identifying keywords related to confidential organizational information, searching public forums for messages including the keywords, and collecting, summarizing, and analyzing data and metadata related to messages found on public forums that include the keywords. The systems and methods described herein may also initiate one or more security actions based on the degree and type of information leakage threat identified.

Leaked information may be intrinsically valuable or may be collected and leveraged by a malicious outsider in a targeted attack on the organization. By identifying information leaks, the organization may take action to prevent or detect targeted attacks based on the leaked information, tailor education programs for organizational insiders to avert future inadvertent information leaks, and/or identify high-risk organizational insiders for increased scrutiny.

Figure 4:
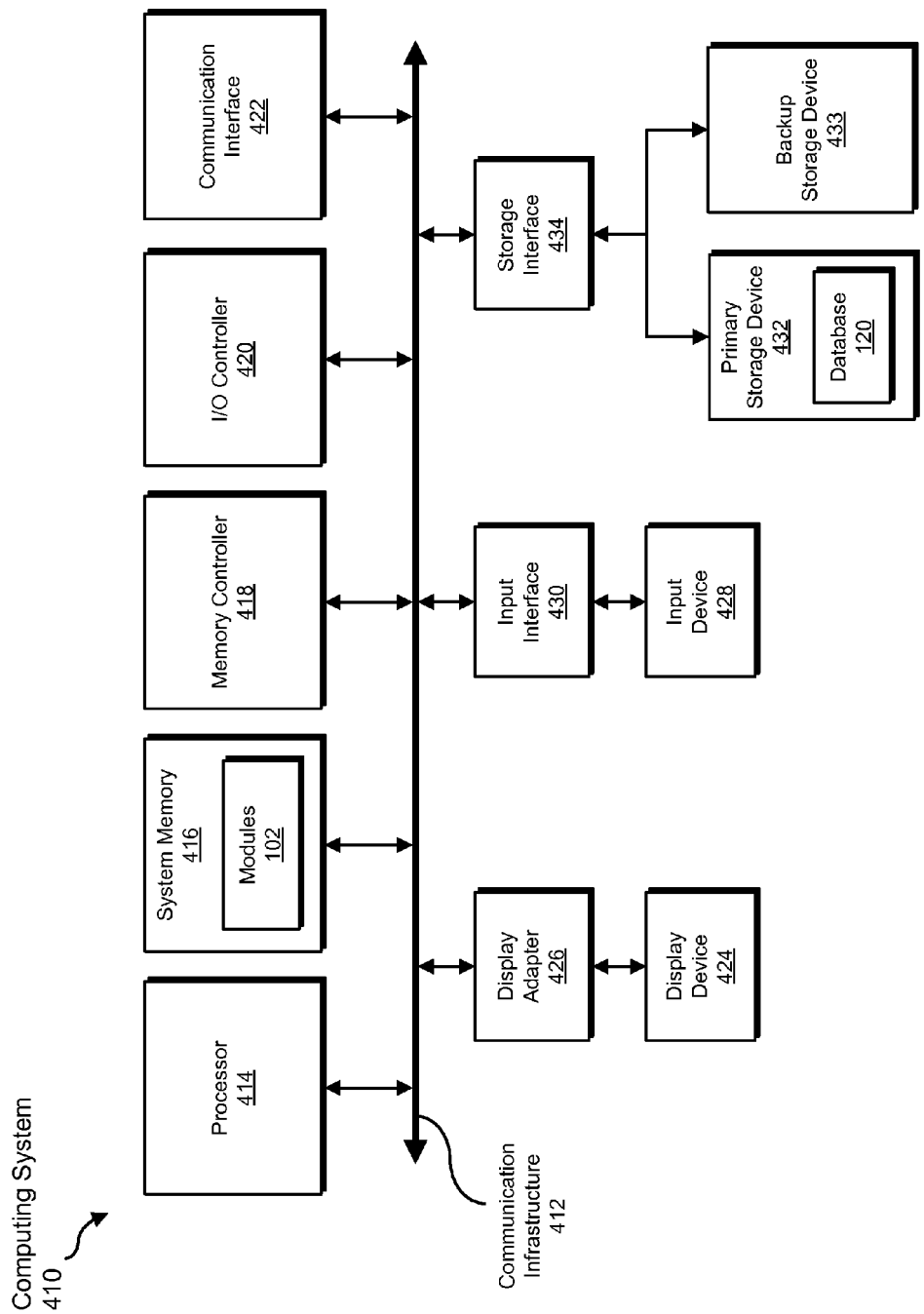
FIG. 4 is a block diagram of an exemplary computing system capable of implementing one or more of the embodiments described and/or illustrated herein.

FIG. 4 is a block diagram of an exemplary computing system 410 capable of implementing one or more of the embodiments described and/or illustrated herein. For example, all or a portion of computing system 410 may perform and/or be a means for performing, either alone or in combination with other elements, one or more of the steps described herein (such as one or more of the steps illustrated in FIG. 3). All or a portion of computing system 410 may also perform and/or be a means for performing any other steps, methods, or processes described and/or illustrated herein.

Computing system 410 broadly represents any single or multi-processor computing device or system capable of executing computer-readable instructions. Examples of computing system 410 include, without limitation, workstations, laptops, client-side terminals, servers, distributed computing systems, handheld devices, or any other computing system or device. In its most basic configuration, computing system 410 may include at least one processor 414 and a system memory 416.

Processor 414 generally represents any type or form of physical processing unit (e.g., a hardware-implemented central processing unit) capable of processing data or interpreting and executing instructions. In certain embodiments, processor 414 may receive instructions from a software application or module. These instructions may cause processor 414 to perform the functions of one or more of the exemplary embodiments described and/or illustrated herein.

System memory 416 generally represents any type or form of volatile or non-volatile storage device or medium capable of storing data and/or other computer-readable instructions. Examples of system memory 416 include, without limitation, Random Access Memory (RAM), Read Only Memory (ROM), flash memory, or any other suitable memory device. Although not required, in certain embodiments computing system 410 may include both a volatile memory unit (such as, for example, system memory 416) and a non-volatile storage device (such as, for example, primary storage device 432, as described in detail below). In one example, one or more of modules 102 from FIG. 1 may be loaded into system memory 416.

In certain embodiments, exemplary computing system 410 may also include one or more components or elements in addition to processor 414 and system memory 416. For example, as illustrated in FIG. 4, computing system 410 may include a memory controller 418, an Input/Output (I/O) controller 420, and a communication interface 422, each of which may be interconnected via a communication infrastructure 412. Communication infrastructure 412 generally represents any type or form of infrastructure capable of facilitating communication between one or more components of a computing device. Examples of communication infrastructure 412 include, without limitation, a communication bus (such as an Industry Standard Architecture (ISA), Peripheral Component Interconnect (PCI), PCI Express (PCIe), or similar bus) and a network.

Memory controller 418 generally represents any type or form of device capable of handling memory or data or controlling communication between one or more components of computing system 410. For example, in certain embodiments memory controller 418 may control communication between processor 414, system memory 416, and I/O controller 420 via communication infrastructure 412.

I/O controller 420 generally represents any type or form of module capable of coordinating and/or controlling the input and output functions of a computing device. For example, in certain embodiments I/O controller 420 may control or facilitate transfer of data between one or more elements of computing system 410, such as processor 414, system memory 416, communication interface 422, display adapter 426, input interface 430, and storage interface 434.

Communication interface 422 broadly represents any type or form of communication device or adapter capable of facilitating communication between exemplary computing system 410 and one or more additional devices. For example, in certain embodiments communication interface 422 may facilitate communication between computing system 410 and a private or public network including additional computing systems. Examples of communication interface 422 include, without limitation, a wired network interface (such as a network interface card), a wireless network interface (such as a wireless network interface card), a modem, and any other suitable interface. In at least one embodiment, communication interface 422 may provide a direct connection to a remote server via a direct link to a network, such as the Internet. Communication interface 422 may also indirectly provide such a connection through, for example, a local area network (such as an Ethernet network), a personal area network, a telephone or cable network, a cellular telephone connection, a satellite data connection, or any other suitable connection.

In certain embodiments, communication interface 422 may also represent a host adapter configured to facilitate communication between computing system 410 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 422 may also allow computing system 410 to engage in distributed or remote computing. For example, communication interface 422 may receive instructions from a remote device or send instructions to a remote device for execution.

As illustrated in FIG. 4, computing system 410 may also include at least one display device 424 coupled to communication infrastructure 412 via a display adapter 426. Display device 424 generally represents any type or form of device capable of visually displaying information forwarded by display adapter 426. Similarly, display adapter 426 generally represents any type or form of device configured to forward graphics, text, and other data from communication infrastructure 412 (or from a frame buffer, as known in the art) for display on display device 424.

As illustrated in FIG. 4, exemplary computing system 410 may also include at least one input device 428 coupled to communication infrastructure 412 via an input interface 430. Input device 428 generally represents any type or form of input device capable of providing input, either computer or human generated, to exemplary computing system 410. Examples of input device 428 include, without limitation, a keyboard, a pointing device, a speech recognition device, or any other input device.

As illustrated in FIG. 4, exemplary computing system 410 may also include a primary storage device 432 and a backup storage device 433 coupled to communication infrastructure 412 via a storage interface 434. Storage devices 432 and 433 generally represent any type or form of storage device or medium capable of storing data and/or other computer-readable instructions. For example, storage devices 432 and 433 may be a magnetic disk drive (e.g., a so-called hard drive), a solid state drive, a floppy disk drive, a magnetic tape drive, an optical disk drive, a flash drive, or the like. Storage interface 434 generally represents any type or form of interface or device for transferring data between storage devices 432 and 433 and other components of computing system 410. In one example, database 120 from FIG. 1 may be stored in primary storage device 432.

In certain embodiments, storage devices 432 and 433 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 432 and 433 may also include other similar structures or devices for allowing computer software, data, or other computer-readable instructions to be loaded into computing system 410. For example, storage devices 432 and 433 may be configured to read and write software, data, or other computer-readable information. Storage devices 432 and 433 may also be a part of computing system 410 or may be a separate device accessed through other interface systems.

Many other devices or subsystems may be connected to computing system 410. Conversely, all of the components and devices illustrated in FIG. 4 need not be present to practice the embodiments described and/or illustrated herein. The devices and subsystems referenced above may also be interconnected in different ways from that shown in FIG. 4. Computing system 410 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 410. All or a portion of the computer program stored on the computer-readable medium may then be stored in system memory 416 and/or various portions of storage devices 432 and 433. When executed by processor 414, a computer program loaded into computing system 410 may cause processor 414 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 410 may be configured as an Application Specific Integrated Circuit (ASIC) adapted to implement one or more of the exemplary embodiments disclosed herein.

Figure 5:
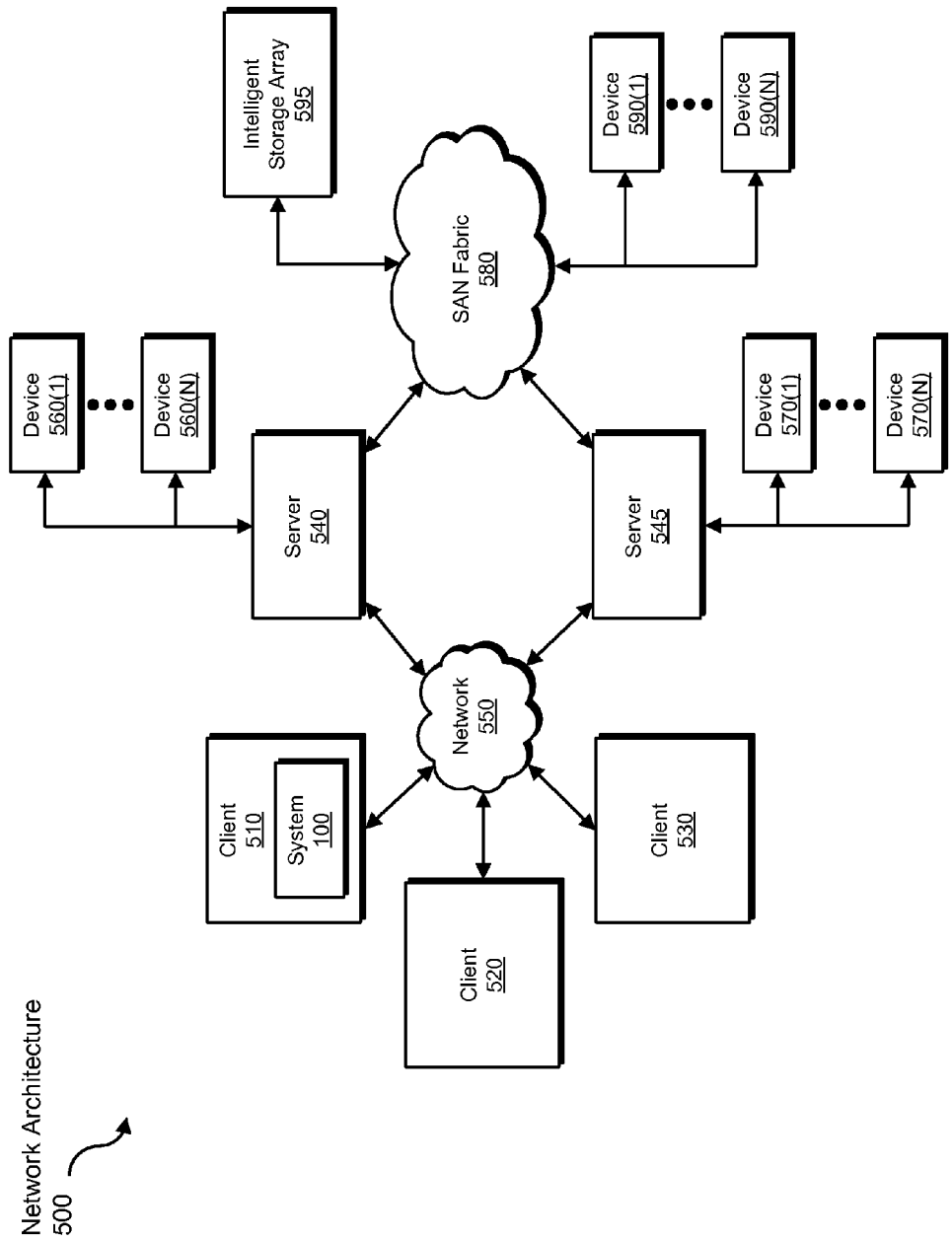
FIG. 5 is a block diagram of an exemplary computing network capable of implementing one or more of the embodiments described and/or illustrated herein.

FIG. 5 is a block diagram of an exemplary network architecture 500 in which client systems 510, 520, and 530 and servers 540 and 545 may be coupled to a network 550. As detailed above, all or a portion of network architecture 500 may perform and/or be a means for performing, either alone or in combination with other elements, one or more of the steps disclosed herein (such as one or more of the steps illustrated in FIG. 3). All or a portion of network architecture 500 may also be used to perform and/or be a means for performing other steps and features set forth in the instant disclosure.

Client systems 510, 520, and 530 generally represent any type or form of computing device or system, such as exemplary computing system 410 in FIG. 4. Similarly, servers 540 and 545 generally represent computing devices or systems, such as application servers or database servers, configured to provide various database services and/or run certain software applications. Network 550 generally represents any telecommunication or computer network including, for example, an intranet, a WAN, a LAN, a PAN, or the Internet. In one example, client systems 510, 520, and/or 530 and/or servers 540 and/or 545 may include all or a portion of system 100 from FIG. 1.

As illustrated in FIG. 5, one or more storage devices 560(1)-(N) may be directly attached to server 540. Similarly, one or more storage devices 570(1)-(N) may be directly attached to server 545. Storage devices 560(1)-(N) and storage devices 570(1)-(N) generally represent any type or form of storage device or medium capable of storing data and/or other computer-readable instructions. In certain embodiments, storage devices 560(1)-(N) and storage devices 570(1)-(N) may represent Network-Attached Storage (NAS) devices configured to communicate with servers 540 and 545 using various protocols, such as Network File System (NFS), Server Message Block (SMB), or Common Internet File System (CIFS).

Servers 540 and 545 may also be connected to a Storage Area Network (SAN) fabric 580. SAN fabric 580 generally represents any type or form of computer network or architecture capable of facilitating communication between a plurality of storage devices. SAN fabric 580 may facilitate communication between servers 540 and 545 and a plurality of storage devices 590(1)-(N) and/or an intelligent storage array 595. SAN fabric 580 may also facilitate, via network 550 and servers 540 and 545, communication between client systems 510, 520, and 530 and storage devices 590(1)-(N) and/or intelligent storage array 595 in such a manner that devices 590(1)-(N) and array 595 appear as locally attached devices to client systems 510, 520, and 530. As with storage devices 560(1)-(N) and storage devices 570(1)-(N), storage devices 590(1)-(N) and intelligent storage array 595 generally represent any type or form of storage device or medium capable of storing data and/or other computer-readable instructions.

In certain embodiments, and with reference to exemplary computing system 410 of FIG. 4, a communication interface, such as communication interface 422 in FIG. 4, may be used to provide connectivity between each client system 510, 520, and 530 and network 550. Client systems 510, 520, and 530 may be able to access information on server 540 or 545 using, for example, a web browser or other client software. Such software may allow client systems 510, 520, and 530 to access data hosted by server 540, server 545, storage devices 560(1)-(N), storage devices 570(1)-(N), storage devices 590(1)-(N), or intelligent storage array 595. Although FIG. 5 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 540, server 545, storage devices 560(1)-(N), storage devices 570(1)-(N), storage devices 590(1)-(N), intelligent storage array 595, or any combination thereof. All or a portion of one or more of the exemplary embodiments disclosed herein may also be encoded as a computer program, stored in server 540, run by server 545, and distributed to client systems 510, 520, and 530 over network 550.

As detailed above, computing system 410 and/or one or more components of network architecture 500 may perform and/or be a means for performing, either alone or in combination with other elements, one or more steps of an exemplary method for detecting information leakage by an organizational insider.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive public forum message data and/or metadata to be transformed, transform the public forum message data to consolidated message data, output a result of the transformation to a database, and use the result of the transformation to identify information leakage threats. In another example, one or more of the modules recited herein may transform a computing system into a system for detecting information leakage by an organizational insider. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for detecting information leakage by an organizational insider, at least a portion of the method being performed by a computing device comprising at least one processor, the method comprising:
    identifying a set of organizational insiders of an organization;
    identifying a set of public forums used by at least one organizational insider in the set of organizational insiders;
    identifying a set of messages that contain sensitive information capable of being leveraged in a targeted attack on the organization and are posted by at least one organizational insider of the organization to at least one public forum in the set of public forums;
    creating a message record corresponding to each message in the set of messages, the message record comprising:
        a message summary; and
        a set of message metadata fields that includes a message metadata field indicating a risk score that quantifies a sensitivity level of contents of the message;
    generating a plurality of message summary records that each comprise a consolidated set of message records that have been grouped based on the sets of message metadata fields within the message records;
    for each message summary record in the plurality of message summary records, determining a likelihood that the message summary record represents leaked sensitive information based on the risk score of the message record within the message summary record;
    identifying an information leakage threat by identifying at least one message metadata field within the plurality of message summary records that indicates an information leak using a machine learning classifier built based on training data comprising metadata fields within message summary records that describe previously-detected information leaks, wherein the machine learning classifier identifies the message metadata field that indicates the information leak by comparing based on the likelihood that each message summary record in the plurality of message summary records represents leaked sensitive information, metadata fields within the plurality of message summary records with the metadata fields within the training data; and
    initiating, based on the information leakage threat, a security action on at least one computing system to prevent a targeted attack that is based on the leaked information.

2. The computer-implemented method of claim 1, wherein the set of public forums comprises at least one of:
    a social media site;
    a website;
    a blog;
    an electronic mailing list;
    a discussion board;
    an electronic bulletin board; and
    a wiki.

3. The computer-implemented method of claim 1, wherein identifying the set of messages posted on the public forum comprises:
    identifying a set of keywords pertaining to at least one of:
        organizational infrastructure of the organization;

confidential organizational information of the organization; and organizational insider personal information of the organizational insiders in the organization; and searching the public forum for messages containing at least one keyword in the set of keywords.

4. The computer-implemented method of claim 3, wherein identifying the set of keywords comprises:
intercepting network communications transmitted by at least one of:
  a network gateway;
  a network router;
  an email gateway;
  a network firewall;
  a proxy server; and
  a data-loss-prevention program; and
compiling the set of keywords from the intercepted network communications.

5. The computer-implemented method of claim 3, wherein searching the public forum for messages containing the keyword comprises at least one of:
  searching the public forum using a search engine;
  searching the public forum using a web crawler; and
  searching the public forum using a database query.

6. The computer-implemented method of claim 1, wherein the set of message metadata fields further comprises at least one of:
  a message source;
  a message destination;
  a timestamp;
  a message type;
  a user identification;
  a data loss prevention classification; and
  a sentiment.

7. The computer-implemented method of claim 1, wherein generating the plurality of message summary records comprises consolidating sets of message records with at least one common message metadata field.

8. The computer-implemented method of claim 1, wherein determining the likelihood that each message summary record represents leaked sensitive information comprises calculating an information leakage threat rating for each message summary record based on the risk score of the message record within each message summary record.

9. A system for detecting information leakage by an organizational insider, the system comprising:
  an insider identification module, stored in memory, that identifies a set of organizational insiders of an organization;
  a forum identification module that identifies a set of public forums used by at least one organizational insider in the set of organizational insiders;
  a message identification module that identifies a set of messages that contain sensitive information capable of being leveraged in a targeted attack on the organization and are posted by at least one organizational insider of the organization to at least one public forum in the set of public forums;
  a message record module, stored in memory, that creates a message record corresponding to each message in the set of messages, the message record comprising:
    a message summary; and
    a set of message metadata fields that includes a message metadata field indicating a risk score that quantifies a sensitivity level of contents of the message;
  a consolidation module, stored in memory, that generates a plurality of message summary records that each comprise a consolidated set of message records that have been grouped based on the sets of message metadata fields within the message records;
  a threat identification module that:
    for each message summary record in the plurality of message summary records, determines a likelihood that the message summary record represents leaked sensitive information based on the risk score of the message record within the message summary record; and
    identifies an information leakage threat by identifying at least one message metadata field within the plurality of message summary records that indicates an information leak using a machine learning classifier built based on training data comprising metadata fields within message summary records that describe previously-detected information leaks, wherein the machine learning classifier identifies the message metadata field that indicates the information leak by comparing, based on the likelihood that each message summary record in the plurality of message summary records represents leaked sensitive information, metadata fields within the plurality of message summary records with the metadata fields within the training data;
  a security module that initiates, based on the information leakage threat, a security action on at least one computing system to prevent a targeted attack that is based on the leaked information; and
  at least one processor configured to execute the insider identification module, the forum identification module, the message identification module, the message record module, the consolidation module, the threat identification module, and the security module.

10. The system of claim 9, wherein the set of public forums comprises at least one of:
  a social media site;
  a website;
  a blog;
  an electronic mailing list;
  a discussion board;
  an electronic bulletin board; and
  a wiki.

11. The system of claim 9, wherein the message identification module identifies the set of messages posted on the public forum by:
  identifying a set of keywords pertaining to at least one of:
    organizational infrastructure of the organization;
    confidential organizational information of the organization; and
    organizational insider personal information of the organizational insiders in the organization; and
  searching the public forum for messages containing at least one keyword in the set of keywords.

12. The system of claim 11, wherein the message identification module identifies the set of keywords by:
  intercepting network communications transmitted by at least one of:
    a network gateway;
    a network router;
    an email gateway;
    a network firewall;
    a proxy server; and
    a data-loss-prevention program; and
  compiling the set of keywords from the intercepted network communications.

13. The system of claim 11, wherein the message identification module searches the public forum for messages containing the keyword by at least one of:
 searching the public forum using a search engine;
 searching the public forum using a web crawler; and
 searching the public forum using a database query.

14. The system of claim 9, wherein the set of message metadata fields further comprises at least one of:
 a message source;
 a message destination;
 a timestamp;
 a message type;
 a user identification;
 a data loss prevention classification; and
 a sentiment.

15. The system of claim 9, wherein the consolidation module generates the plurality of message summary records by consolidating sets of message records with at least one common message metadata field.

16. The system of claim 9, wherein the threat identification module determines the likelihood that each message summary record represents leaked sensitive information by calculating an information leakage threat rating for each message summary record based on the risk score of the message record within each message summary record.

17. A non-transitory computer-readable-storage medium comprising one or more computer-readable instructions that, when executed by at least one processor of a computing device, cause the computing device to:
 identify a set of organizational insiders of an organization;
 identify a set of public forums used by at least one organizational insider in the set of organizational insiders;
 identify a set of messages that contain sensitive information capable of being leveraged in a targeted attack on the organization and are posted by at least one organizational insider of the organization to at least one public forum in the set of public forums;
 create a message record corresponding to each message in the set of messages, the message record comprising:
  a message summary; and
  a set of message metadata fields that includes a message metadata field indicating a risk score that quantifies a sensitivity level of contents of the message;
 generate a plurality of message summary records that each comprise a consolidated set of message records that have been grouped based on the sets of message metadata fields within the message records;
 for each message summary record in the plurality of message summary records, determine a likelihood that the message summary record represents leaked sensitive information based on the risk score of the message record within the message summary record;
 identify an information leakage threat by identifying at least one message metadata field within the plurality of message summary records that indicates an information leak using a machine learning classifier built based on training data comprising metadata fields within message summary records that describe previously-detected information leaks, wherein the machine learning classifier identifies the message metadata field that indicates the information leak by comparing, based on the likelihood that each message summary record in the plurality of message summary records represents leaked sensitive information, metadata fields within the plurality of message summary records with the metadata fields within the training data; and
 initiate, based on the information leakage threat, a security action on at least one computing system to prevent a targeted attack that is based on the leaked information.

18. The non-transitory computer-readable-storage medium of claim 17, wherein the set of public forums comprises at least one of:
 a social media site;
 a website;
 a blog;
 an electronic mailing list;
 a discussion board;
 an electronic bulletin board; and
 a wiki.

19. The computer-implemented method of claim 1, wherein the security action comprises at least one of:
 notifying an administrator of the information leakage threat;
 initiating a data security restriction policy for at least one organizational insider;
 initiating a data security restriction policy for at least one information resource; and
 initiating a network access restriction policy for at least one public forum.

20. The computer-implemented method of claim 1, wherein identifying the information leakage threat further comprises at least one of:
 identifying sensitive information included in at least one message summary record, the leaked sensitive information comprising at least one of:
  personal information;
  financial information;
  physical infrastructure information; and
  data security information;
 identifying an organizational insider that potentially leaked information to at least one public forum; and
 identifying a public forum where at least one organizational insider posted potentially leaked information.

* * * * *